3,381,122
ILLUMINATED CLIP BOARD
Albert P. Boyle, Jr., 1424 Darling St., Ogden, Utah 84403
Filed Mar. 25, 1966, Ser. No. 537,400
1 Claim. (Cl. 240—6.4)

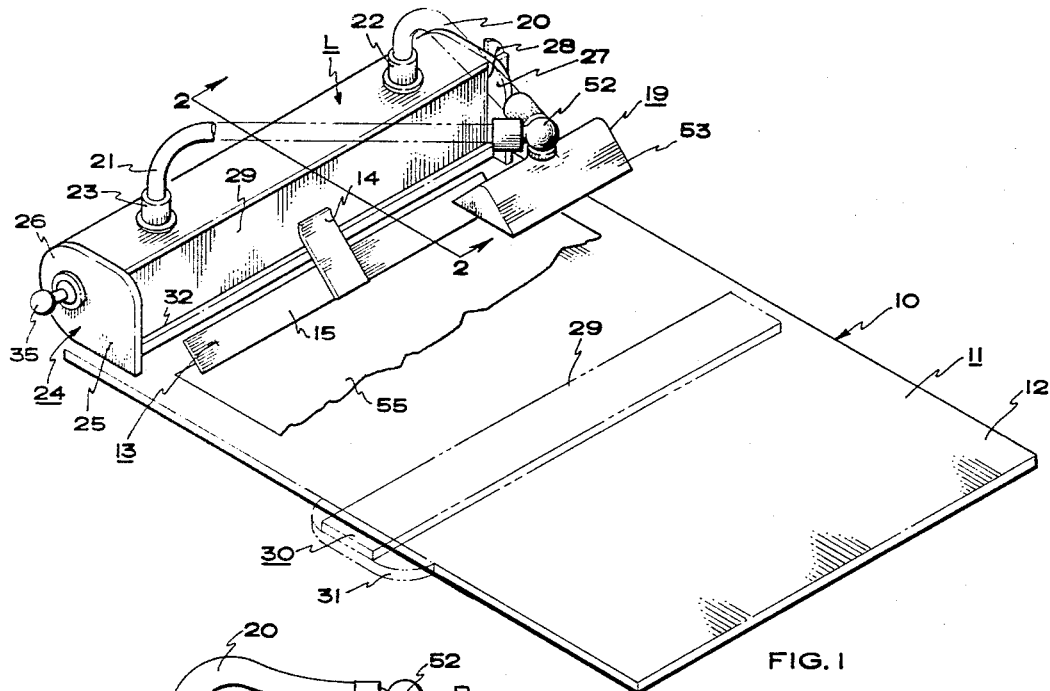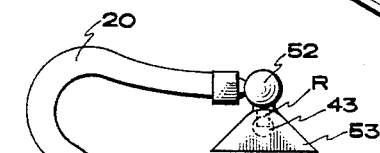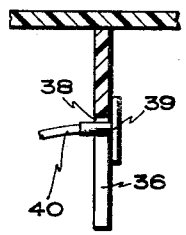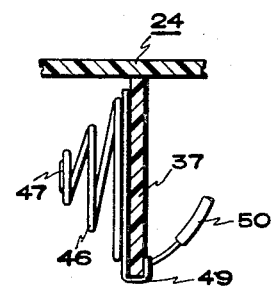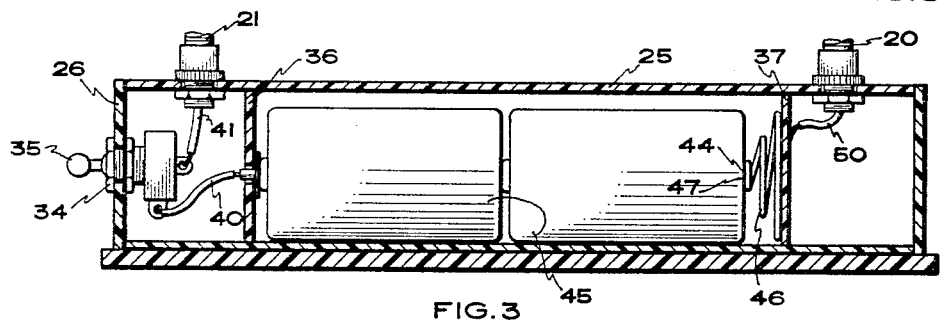

ABSTRACT OF THE DISCLOSURE

The device comprises an illuminated clip board incorporating a battery and a light source for selectively illuminating the writing surface of the clip board. The battery container of the clip board is specially designed so that its front panel may selectively serve as a T-square for the clip board.

---

The present invention relates to clip boards used in writing and, more particularly, to a new and useful clip board which is illuminated.

In the past, a number of different types of writing aids have developed. One of the most useful is the clip board. This implement simply takes the form of a panel having an upper writing surface, with a suitable clip being mounted to the panel at or near the top margin thereof to retain writing papers or order sheets on the writing surface of the board.

Present clip boards, of which the inventor is aware, do not accommodate use in the dark or in subdued lighting. Thus, the nurse or doctor at a hospital, the operator of an airline, and other individuals must, of necessity, carry an auxiliary flashlight in order to see the writing surface presented by the clip board during nighttime intervals or during periods of subdued lighting. It would, of course, be highly advantageous for a clip board to incorporate its own, dry-cell operated, light source which could be turned on in order to illuminate, when necessary, the writing sheets disposed on the clip board.

Accordingly, a principal object of the present invention is to provide a new and improved clip board which self-contains its own light source.

A further object of the invention is to provide an illuminated clip board wherein objects used (1) to retain the intended batteries in their intended places, and (2) to supply the necessary electrical contact are very inexpensively manufactured and easily installed in place.

An additional object is to provide an illuminated clip board wherein the case for the dry-cell batteries, supplied the clip board, is also provided with a front enclosure on panel portion that can optionally be used as a T-square with the clip board.

An additional object is to provide a clip board having an illuminating light constructed so that the over-all clip board design can be rugged, easily used, and not subject to inadvertently-caused damage.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

FIGURE 1 is a perspective view, partially broken away for purposes of clarity, of an illuminated clip board, according to the present invention.

FIGURE 2 is a fragmentary section taken along the line 2—2 in FIGURE 1.

FIGURE 3 is an enlarged vertical section taken along the line 3—3 in FIGURE 2.

FIGURES 4 and 5 are horizontal sections taken centrally through the partitions of FIGURE 3.

In FIGURE 1 the clip board 10 of the present invention is shown to include a panel 11 having upper writing surface 12. Affixed to panel 11 will be a retainer clip 13, which preferably includes thumb depressing tab 14 and cross bar 15, secured thereto. Securing the cross bar 15 to panel 11 is a conventional wire clip 16. Wire clip 16 may be affixed both to the cross bar 15 and also to panel 11 by epoxy cement or by other means at 17 and 18.

Also included in the construction is a light means L which takes the form of light 19, secured by flexible conduit 20 and 21 and the latter's attachments 22 and 23 to battery case 24. Battery case 24 includes a battery case member 25 having end portion 26 and 27, the latter of which is provided a slot 28. Slot 28 is included for the reception of a panel or slide 29, constituting a T-square 30. A T-square 30 (shown also in phantom lines in its operative position) will also include guide head 31 in the usual manner. Also included in the construction of the battery case member will be a groove 32 for receiving T-square panel or groove 29. Thus, an important feature of the invention is the provision of T-square 30 which serves not only as a rule, as in FIGURE 1, but, when stored through the slot 28 to comprise the front panel of the battery case 24, will serve to hold the batteries and aligned attachments in place.

In continuing with the construction of the present invention, it will be seen that end 26 is supplied with a suitable aperture 34 for providing the mounting of on-off switch 35. Switch 35 can take any one of several forms, but preferably is a toggle switch. The battery case member 25 is also shown to include partitions 36 and 37. Partition 36 is provided with a slot 38 for the reception of contact head 39. Contact head 39 may be simply a button or other configuration providing for a contact thereto of lead 40. The remaining electrical lead 41 may be routed through flex conduit 21 to the receptacle R of light 43.

Of interest is the construction of the remaining contact at 44 with dry-cell batteries 45. The remaining contact will include the usual contact spring 46 and button 47, and also includes a doubled-back base plate 49, soldered to spring 46, and which slips over the partition 37 in a friction mount. In this manner the contact can be pressed onto the partition and be so secured in place without additional attachments or other structure. Finally, the electrical lead 50 can be easily secured to the double-back plate 49 for satisfactory retention of the lead and routing through conduit 20 to electric light 19.

The structure of the mounts at 22 and 23 is strictly conventional so far as mounting of flexible conduit to objects are concerned. The same will be provided with appropriate nuts 51 at each of the two mounts and the flexible conduit 20 and 21 themselves, secured to a suitable Y connection 52, associated with light reflector 53. The light socket R associated with reflector 53 will be simply conventional in form. The connection at 52 may or may not be a ball-and-socket connection, as desired.

It is seen that the light 43 and batteries 45 are connected together with switch 35 such that the switch and light are disposed in series across series-connected batteries 45. Hence, on/off switch 35 serves to light the light 43 when desired. This light serves to illuminate the writing sheets 55 which are releasably positioned over writing surface 12 or the panel by means of clip 13. The sheets themselves will be either paper, velum, or other suitable material for receiving pencil or ink impressions. It is important to note that the T-square 30, again, can serve both the ruling function and also, when stored, keep the batteries 45 in place with their several connectors.

Accordingly, what is supplied, therefore, is a new and useful clip board, which can be actuated for illumination when desired. The illumination supplying means is ideally stored at the head or top margin of the clip board; preferably, flexible conduit at 20 and 21 are supplied so that the over-all construction will be rugged, thus avoiding damage should the unit be dropped inadvertently or otherwise jarred.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

1. An illuminated clip board including, in combination, a panel having an upper writing surface, means affixed to said panel for releasably securing writing sheets to said panel over said upper writing surface, and manually actuatable light means secured to said panel for selectively illuminating a writing sheet disposed over said upper writing surface, wherein said light means includes a battery case affixed to said panel, and dry-cell battery means operatively disposed in said case, and wherein said battery case includes a case member having front panel, aligned, receiving slots; and a front panel comprising a T-square member constructed for use with said panel and designed for storage and battery retention by removable disposition through said receiving slots of said case member.

References Cited
UNITED STATES PATENTS

| | | | |
|---|---|---|---|
| 1,030,825 | 6/1912 | Knoerzer et al. | 240—6.4 |
| 1,145,848 | 7/1915 | Robins | 240—6.4 |
| 2,029,425 | 2/1936 | Kaylor et al. | 240—6.4 |
| 2,492,034 | 12/1944 | Clyne | 240—6.4 |
| 2,629,045 | 2/1953 | Frohlich | 240—6.45 |

FOREIGN PATENTS

| | | |
|---|---|---|
| 103,001 | 1/1924 | Germany. |

NORTON ANSHER, *Primary Examiner.*

J. W. PRICE, *Assistant Examiner.*